United States Patent
Ishikawa et al.

(10) Patent No.: US 6,659,646 B2
(45) Date of Patent: Dec. 9, 2003

(54) OIL DYNAMIC PRESSURE BEARING DEVICE AND METHOD FOR MANUFACTURING THE SAME

(75) Inventors: Masayuki Ishikawa, Nagano (JP); Hidetoshi Sunohara, Nagano (JP); Nobuyuki Nakamori, Nagano (JP); Takao Nakae, Nagano (JP)

(73) Assignee: Sankyo Seiki MFG. Co., Ltd., Nagano (JP)

( * ) Notice: Subject to any disclaimer, the term of this patent is extended or adjusted under 35 U.S.C. 154(b) by 53 days.

(21) Appl. No.: 10/145,577

(22) Filed: May 13, 2002

(65) Prior Publication Data

US 2002/0191874 A1 Dec. 19, 2002

(30) Foreign Application Priority Data

May 16, 2001 (JP) ........................................ 2001-145859

(51) Int. Cl.[7] .............................................. F16C 32/06
(52) U.S. Cl. ..................................... 384/100; 29/898.02
(58) Field of Search ............................... 384/100, 114, 384/115; 29/898.02

(56) References Cited

U.S. PATENT DOCUMENTS

| | | | |
|---|---|---|---|
| 5,271,677 A | * 12/1993 | Sherman et al. | ............. 384/114 |
| 5,688,053 A | * 11/1997 | Itoh et al. | .................... 384/100 |
| 5,924,798 A | * 7/1999 | Usui | ........................... 384/114 |
| 6,338,574 B1 | * 1/2002 | Shimizu et al. | ............. 384/115 |
| 6,409,389 B1 | * 6/2002 | Kadokura et al. | .......... 384/100 |

FOREIGN PATENT DOCUMENTS

JP          07-091448          4/1995

* cited by examiner

Primary Examiner—Thomas R. Hannon
(74) Attorney, Agent, or Firm—Hogan & Hartson, LLP

(57) ABSTRACT

An oil dynamic pressure bearing device comprises a bearing, a shaft freely rotatably supported by the bearing in a non-contact manner, and a dynamic pressure bearing section defined by at least one dynamic pressure groove on at least one side of the shaft and the bearing for generating dynamic pressure by a lubricant fluid filled in a minute gap between the shaft and the bearing. Grinding scratches are formed on the dynamic pressure bearing section in a circumferential direction of the dynamic pressure bearing section. The dynamic pressure groove may be formed only on one side of either the shaft or the bearing at the dynamic pressure bearing section and the grinding scratches are formed only on the other side.

21 Claims, 2 Drawing Sheets

OIL DYNAMIC PRESSURE BEARING DEVICE AND METHOD FOR MANUFACTURING THE SAME

BACKGROUND OF THE INVENTION

1. Field of the Invention

The present invention relates to an oil dynamic pressure bearing device formed from dynamic pressure grooves on at least one side of the opposing surfaces between a shaft and a bearing where oil is filled between the minute gap between the shaft and the bearing, and its manufacturing method.

2. Description of Related Art

As a bearing device for a hard disk drive motor, for example, there are considerations to use an oil dynamic pressure bearing device which has dynamic pressure grooves formed on at least one side of the opposing surfaces between the shaft and the bearing where oil is used as a lubricant filling the minute gap between the opposing shaft and bearing. For example, in motors for hard disk drives, a helical groove is formed on the outside of the dynamic pressure groove to prevent the oil from scattering from the bearing section because oil could render the hard disk unusable. Thus, the helical groove enhances the reliability of the oil dynamic pressure bearing and to extends the service life of the motor.

FIG. 3 is a developed view of a conceptual structure of a conventional bearing. Dynamic pressure generation grooves 3 are formed on two places in the shaft direction of the outer circumference of the shaft 1. This shaft 1 is inserted into the bearing hole of the sleeve-shaped bearing 2, forming a minute gap between the outer circumference of the shaft 1 and the bearing hole of the bearing 2.

Oil is used as lubricant to fill the minute gap. The oil generates dynamic pressure as the shaft 1 rotates around the bearing 2. This dynamic pressure allows the shaft 1 to be supported by the bearing 2 in a non-contact manner without physical contact. Helical (spiral) grooves 4 are formed on the bearing hole of the bearing 2 on the outside of the two dynamic pressure generation grooves 3. Oil is forced inward on the bearing 2 through the pumping force generated by the helical grooves 4, thus preventing the oil from scattering outside.

However, while available technologies explained above may be able to achieve the prescribed objective in terms of the reliability in preventing the scattering of oil when the motor turns, it will be difficult to prevent the wear and burning at the dynamic pressure bearing section caused by the contact between the shaft and the bearing when the motor is started, stopped or when the position of the motor is changed.

Also, there has been proposed a technique to prevent the break in oil film on the dynamic pressure bearing section. In the proposed technique, either the bearing or the rotating shaft is formed by a sintered oil-retaining bearing while the other is formed into a random rough surface. While this technique is applicable to a sintered oil-retaining bearing, the random rough surface that has no set directionality does not work effectively in dynamic pressure bearings of the type whose dynamic pressure is obtained from a non oil-retaining type dynamic pressure groove.

SUMMARY OF THE INVENTION

The present invention has been made to solve the problems explained in conventional technologies described above. The present invention thus pertains to providing an oil dynamic pressure bearing device and a method for manufacturing the oil dynamic pressure bearing device, which prevents wear or burning by the contact between the shaft and the bearing even when the rotation starts or stops, or there is a change in position of the bearing, by enhancing the fit of the shaft with respect to the bearing and the oil retaining properties as a lubricating agent.

In accordance with an embodiment of the present invention, an oil dynamic pressure bearing device has a dynamic pressure groove that generates dynamic pressure on at least one side of the opposing shaft and bearing, in which oil is filled in the minute gap between the shaft and the bearing as lubricant fluid, wherein grinding scratches that are formed in the direction of the circumference as the dynamic pressure bearing section is ground are provided independently throughout the circumference.

In the present embodiment, when the dynamic pressure bearing section, on which the grinding scratches are formed, is traced in the shaft direction, which is perpendicular to the direction in which the scratches are formed, the degree of surface roughness Ry may preferably be Ry=about 0.02 s to 3.2 s.

In the present embodiment, a dynamic pressure groove may be formed only on one side of either the shaft or the bearing of the dynamic pressure bearing section and the grinding scratches may be formed only on the other side. However, the dynamic pressure groove may preferably be formed only on the bearing side of the dynamic bearing section, and the grinding scratches on the shaft side, because it does not affect the formation of the dynamic pressure groove.

Also, grease, highly viscose oil or solid lubricant may preferably be applied on the dynamic pressure bearing section on which the grinding scratches are formed.

Moreover, in the present embodiment, the grinding scratches in the direction of the circumference may be formed independently from one another and arranged through the entire circumference, each of the grinding scratches continuously extending one third or more of the circumference in the direction of the circumference.

The grinding scratches in the circumference direction are designed to facilitate the flow of oil to the direction of the circumference, the direction of the rotation. Therefore, the effect of the present invention cannot be expected if short scratches are formed too far apart. It will also make manufacturing more difficult. In a preferred embodiment, the grinding scratch may be shaped in concentric form or spiral form. However, when a plurality of scratches, each of the scratches extending one third or more of the circumference, are formed independently from one another, even though they do not extend longer than one circle around the circumference, the same effect that may be obtained by scratches in concentric form can be obtained if the scratches in total are formed around the entire circumference of the shaft. It is noted that this does not mean that the grinding scratches must be in a concentric form.

Also, it is necessary to exert caution so as not to make the length of the grinding scratch too long in the shaft direction if the grinding scratch is formed in the direction of the circumference into a spiral form. Notably, if the spiral form scratch extends to the outside the bearing section in the shaft direction, caution must be exerted to prevent the oil from being led to the outside of the bearing section by the spiral grinding scratch. Because of this, it is best to sever the spiral-form grinding scratch to make them independent so they do not connect at length. Moreover, if the spiral scratch extends to the outside the bearing section in the shaft direction, the spiral scratch may preferably be formed such that the flow direction of the oil should be formed in the direction toward the interior of the bearing by taking into consideration the direction of rotation.

Moreover, in accordance with another embodiment of the present invention, in a method for manufacturing an oil dynamic pressure bearing device that has a dynamic pressure groove that generates dynamic pressure on at least one side of the opposing shaft and bearing, in which oil is filled in the minute gap between the shaft and the bearing as lubricant fluid, wherein grinding scratches are formed on the dynamic pressure bearing section in a direction of the circumference independently from one another throughout the circumference by grinding the dynamic pressure bearing section.

In the embodiment described above, the grinding scratches may be formed with lapping sheet, abrasive cloth containing abrasive particles or sandpaper, or with centerless grinding.

Other features and advantages of the invention will be apparent from the following detailed description, taken in conjunction with the accompanying drawings that illustrate, by way of example, various features of embodiments of the invention.

EMBODIMENTS OF THE PRESENT INVENTION

An oil dynamic pressure bearing device in accordance with an embodiment of the present invention and its manufacturing method are described below with reference to the accompanying drawings.

First, a method for manufacturing an oil dynamic pressure bearing device in accordance with an embodiment of the present invention will be described with reference to FIG. 1. The embodiment refers to a motor that has an oil dynamic pressure bearing device.

Figure 1:
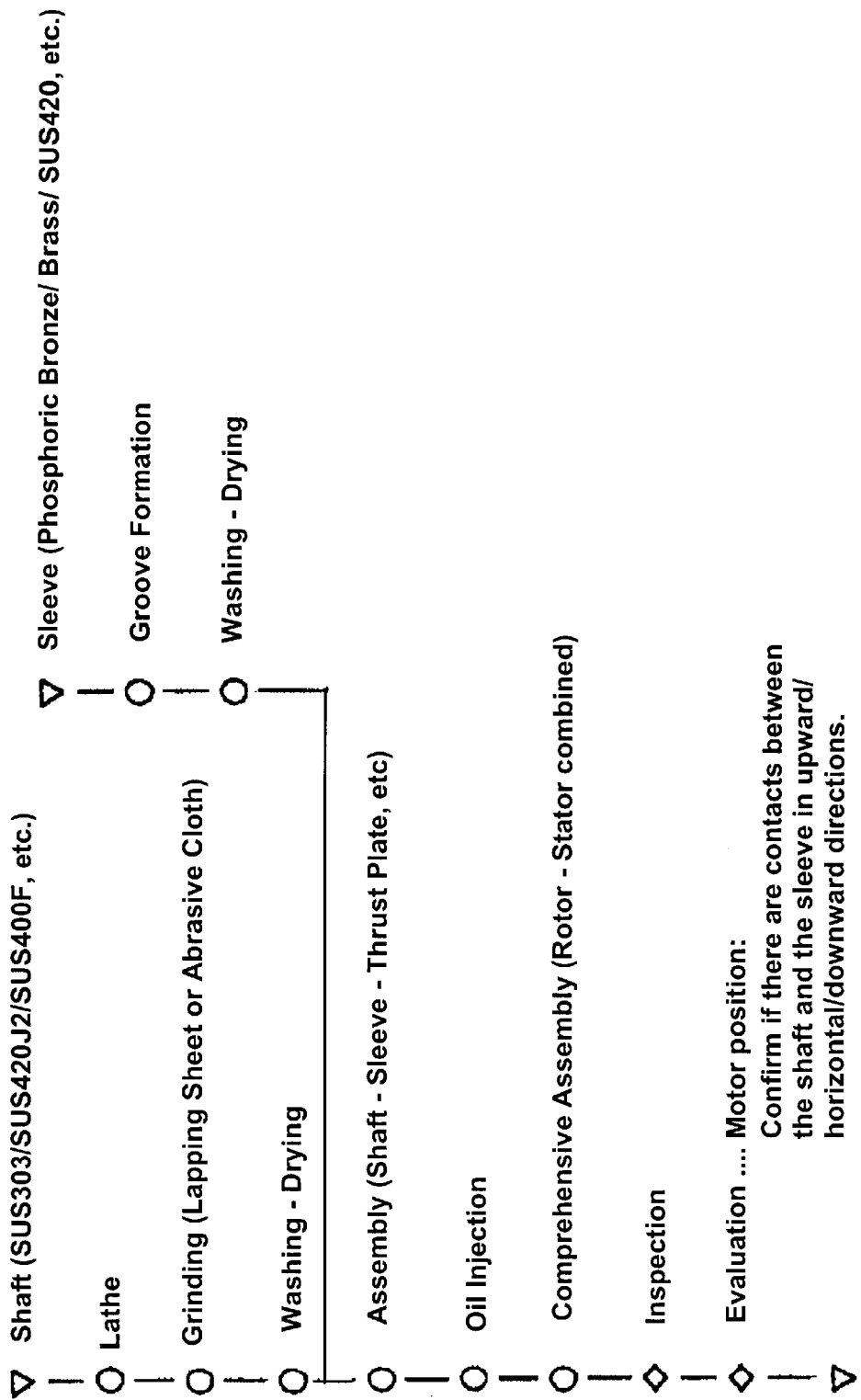
FIG. 1 is a flow chart of a method for manufacturing an oil dynamic pressure bearing device in accordance with one embodiment of the present invention.

In FIG. 1, a shaft composed of SUS (stainless steel) 303, SUS420J2, SUS400F, or other appropriate material, is set on a lathe and ground by rotating the shaft. The grinding is done by using lapping sheet, abrasive cloth containing abrasive particles or sandpaper, and by applying these abrasive materials on the rotating shaft to form scratches on the shaft. Also, grinding scratches can be formed with center-less grinding. Through this grinding operation, grinding scratches are formed in the circumference direction of the shaft. Next, the shaft is washed and dried.

On the other hand, a sleeve, that is the bearing, is processed. The material for the bearing may be phosphoric bronze, brass, SUS420F or any other suitable material. Grooves, which define dynamic pressure grooves, are formed in the bearing hole of the bearing, and subsequently the bearing is washed and dried.

The shaft and the bearing processed as above are sent to an assembly step. At this assembly step, the shaft, bearing, thrust plate and other parts are assembled in the prescribed structure. Next, oil is inserted as the lubricant the minute gap formed between the opposing surfaces of the shaft and the bearing. Next, the assembly is sent to a comprehensive assembly step to built a motor with an oil dynamic pressure bearing device where the rotor and stator are combined.

Subsequently, the assembly is sent to an inspection station and then to an evaluation station. In the evaluation step, it is verified whether there is contact between the shaft and the bearing under the motor's various postures or orientations, which are in the upward, horizontal and downward orientations.

In the above manufacturing process, an example was explained how the shaft was integrated into a structure with other parts after the shaft was ground on its own. However, the shaft can be ground after it is assembled with other parts such as a disk mounting hub. In this manner, it may be preferable to grind the shaft after it is assembled with other parts because this prevents the risk of scratching the shaft in the direction of the shaft when it is assembled.

For example, in the above manufacturing method, #8,000–#3,000 lapping sheets (films) are used in the step of grinding the shaft. By pressing the sheet against the shaft rotating on the lathe, as explained above, the shaft is ground in the direction of its circumference to create grinding scratches in the direction of the circumference. In another method, the shaft may be ground with a cloth containing abrasive particles. The surface roughness Ry of the shaft after the grinding may preferably be Ry=about 0.2 s to 3.2 s, which is a roughness with a 0.22~3.2 $\mu$m difference between the peaks and valleys. In this case, the degree of surface roughness expresses the measurement difference in $\mu$m of the peaks and valleys of the grinding scratches obtained by tracing the grinding scratches portions in a direction perpendicular to the shaft direction, that is the grinding direction.

If the above process is implemented, the following effect can be obtained by grinding the shaft surface in the direction of the circumference.

By arranging the grinding scratches in the circumference direction, the shaft surface would have a favorable degree of wetness due to the fact that the lubricant oil can move easily in the direction of the circumference, and causing oil to remain on the bearing surface. For example, even if scratches are made in the shaft direction during the manufacturing or assembly processes, since the grinding scratches are created in the circumference direction, the burning of the motor can be prevented even if the motor rotates at high speed because the above scratches in the shaft direction will not cause any cut off in the flow of oil.

By creating grinding scratches in the circumference direction, impurities layer on the shaft surface will be removed, or as the impurities will be positioned in the bottom section of the grinding scratches, they will unlikely be exposed to the shaft surface. Thus, it is possible to increase the compatibility with the bearing oil.

Also, by arranging the grinding scratches in the circumference direction, oil will find it difficult to move in the direction of the shaft. Therefore, even if the motor position is changed, it is possible to prevent the oil flow from being cut off. Thus, there will be no burning. And this realizes an enhancement in the reliability and the longevity of the motor.

As the grinding of the shaft surface is made in the direction of the circumference, there is no cut off in the oil flow during its rotation compared to a case when the scratches are formed in the shaft direction. Because of this, the oil flow is retained even if the motor rotates at high speed, thus preventing any burning.

Also, the shaft and the bearing are prevented from coming in contact with each other due to the cut off in oil flow when the rotation starts, or stops, or when the position or orientation of the motor or the bearing changes. This leads to enhanced reliability and longer life of the oil dynamic pressure bearing device.

If the grinding scratches are formed in the shaft direction instead of the circumference, the oil flow will be cut off relatively quickly during high speed rotation. The reasons for this are presumably that oil is scraped up by the tip of the grinding scratch in the shaft direction, or that the scratches in the shaft direction disturb the flow in the circumference direction.

Moreover, the defect rate of hard disk drive motors using shafts that are not processed according to the present invention was 70% compared to virtually zero defect for hard disk drive motors using shafts that are ground in the above embodiment.

Figure 3:
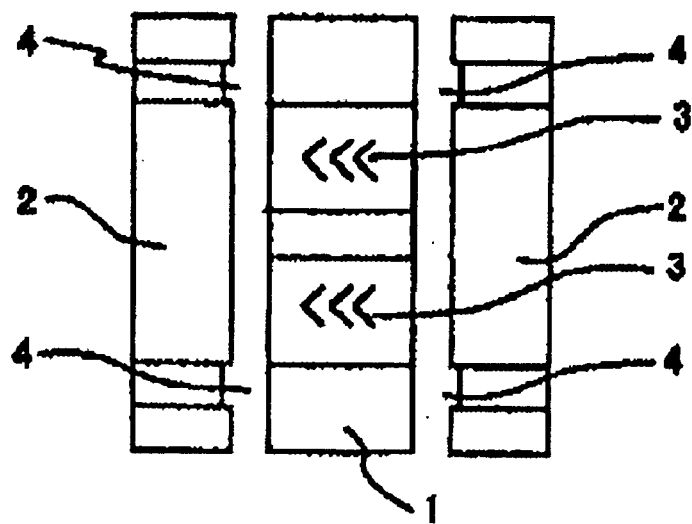
FIG. 3 is a developed view of a conventional oil dynamic pressure bearing device.

The oil dynamic pressure bearing device assembled in the way described above may be configured in a way as shown in the conventional example of FIG. 3, where the shaft with the dynamic pressure grooves formed is inserted in the bearing hole of the bearing, with lubricant oil filling the minute gap between the shaft and the bearing, or with the grooves being formed on bearing hole surface of the bearing.

Also, as for the grinding scratches formed in the radial-direction, that characterize this invention, these scratches may be formed on the surface of the bearing groove on the bearing side. And, from the standpoints of parts processing ease and facilitating precision manufacturing, it is desirable to form the dynamic pressure groove only on one side of either the shaft or the bearing, and to form the grinding scratches on the other side, opposite to it.

After the shaft surface is ground, grease or high viscosity oil may preferably be applied on the grinding scratch section. Alternatively, solid lubricant like $MoS_2$ may be applied instead of fluid oil. In this case, the solid lubricant should not be thicker than the shaft's outer diameter. Or, the outer diameter of the shaft should be enlarged as the film thickness of the solid lubricant. When forming grinding scratches on the bearing hole surface, the solid lubricant must not be thicker than the inner diameter of the bearing hole, or the inner diameter of the bearing hole must be as thick as the film thickness of the solid lubricant. In this manner, by applying lubricant, such as oil, on the grinding scratch section, it is possible to enhance the reliability and lengthen the life of the motor by preventing the cut off in oil flow and the burning of the motor even when the motor position is changed.

Figure 2:
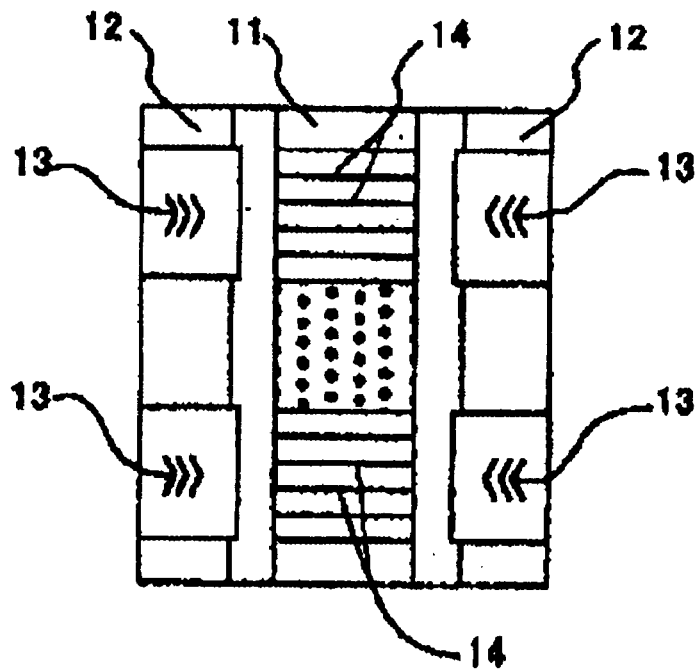
FIG. 2 is a developed view of an oil dynamic pressure bearing device in accordance with one embodiment of the present invention.

Next, another embodiment of the present invention is shown in FIG. 2. This embodiment entails forming herring bone type dynamic pressure grooves 13, in an ordinary manner, on two places in the axial direction of a bearing hole surface of a bearing 12, and inserting a shaft 11 in the bearing hole. The grinding scratches in the circumference direction are formed on the surface of shaft 11 in advance of the assembly. Reference numeral 14 denotes sections where the grinding scratches are formed. In this embodiment, four independent circular grooves are formed in the circumference direction on the respective bearing sections. While the grinding scratch forming sections 14 are formed respectively in two places in the shaft direction to correspond to the respective dynamic pressure grooves 13 described above, the grinding scratches may also be formed throughout the length of the shaft 11. It is desirable to apply proper amounts of lubricants, as explained above, on the sections 14 where the grinding scratches are formed. If this embodiment is followed, one can expect the same type of operational effect as in the case of the aforementioned embodiment.

The following effects can be obtained by the present invention.

(1) Because of the grinding scratches made in the circumference direction of the shaft or the bearing hole surface, the surface is reasonably rough such that oil will flow in the direction of the circumference, thus favorably wetting the surface as lubricant oil as the bearing surface or bearing hole surface retains the oil. Because of this, there is not cut off of oil even during high-speed rotation, thus preventing any burning.

(2) The impurities layer on either the shaft surface or the bearing hole surface is removed, which enhances the compatibility with the bearing oil. Thus, even if the position or the orientation of the motor is changed, there is no cut off in the oil flow. Therefore, there is no burning, thus, the reliability and longevity of the bearing are enhanced.

(3) By arranging the grinding direction on the shaft surface or bearing hole surface in the direction of the circumference, the oil flow during rotation is not cut off. Because of this, the bearing retains oil even during high-speed rotation, preventing any burning.

(4) By applying grease, high viscosity oil or solid lubricant agent on the area where the grinding scratches are formed, any cut off in oil flow is prevented even if the position of the motor is altered, thus preventing burning and enhancing the reliability and longevity of the oil dynamic pressure bearing device.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. An oil dynamic pressure bearing device comprising a bearing and a shaft freely rotatably supported by the bearing in a non-contact manner, the oil dynamic pressure bearing device comprising:

a dynamic pressure bearing section defined by dynamic pressure grooves on at least one side of the shaft and the bearing for generating dynamic pressure by a lubricant fluid filled in a minute gap between the shaft and the bearing; and grinding scratches formed on the dynamic pressure bearing section in a circumferential direction.

2. An oil dynamic pressure bearing device according to claim 1, wherein the grinding scratches are formed in plurality, independently from one another throughout the circumference.

3. An oil dynamic pressure bearing device according to claim 1, wherein the grinding scratches are formed in plurality, independently from one another, all of the grinding scratches extending along a complete circle throughout the circumference.

4. An oil dynamic pressure bearing device according to claim 1, wherein the grinding scratches are formed independently from one another, each of the grinding scratches extending along at least one third of the circumference.

5. An oil dynamic pressure bearing device according to claim 1, wherein, when the dynamic pressure bearing section, at which the grinding scratches are formed, is traced in an axial direction of the shaft, which is perpendicular to a direction in which the grinding scratches are formed, the degree of surface roughness Ry is Ry=about 0.02 s to 3.2 s.

6. An oil dynamic pressure bearing device according to claim 1, wherein the dynamic pressure grooves are formed only on one side of either the shaft or the bearing at the dynamic pressure bearing section and the grinding scratches are formed only on the other side.

7. An oil dynamic pressure bearing device according to claim 6, wherein the dynamic pressure grooves are formed only on the bearing side at the dynamic pressure bearing section and the grinding scratches are formed only on the shaft side.

8. An oil dynamic pressure bearing device according to claim 1, wherein grease, highly viscous oil or solid lubricant is applied on the dynamic pressure bearing section on which the grinding scratches are formed.

9. An oil dynamic pressure bearing device according to claim 1, wherein the grinding scratches in the direction of the circumference are formed independently from one another, each of the grinding scratches continuously extending one third or more of the circumference in the direction of the circumference and arranged such that the grinding scratches as a whole are arranged along the entire circumference.

10. An oil dynamic pressure bearing device according to claim 9, wherein the grinding scratches in the direction of the circumference are arranged in plurality in concentric form.

11. An oil dynamic pressure bearing device according to claim 9, wherein the grinding scratches in the direction of the circumference are arranged in helical form at a plurality of locations, independently from one another.

12. An a method for manufacturing an oil dynamic pressure bearing device comprising a bearing, a shaft freely rotatably supported by the bearing in a non-contact manner, and a dynamic pressure bearing section defined by dynamic pressure grooves provided on at least one side of the shaft and the bearing for generating dynamic pressure by a lubricant fluid filled in a minute gap between the shaft and the bearing, the method comprising:

grinding the dynamic pressure bearing section to form grinding scratches in a circumferential direction of the dynamic pressure bearing section.

13. A method for manufacturing an oil dynamic pressure bearing device according to claim 12, wherein the grinding scratches are formed in plurality, independently from one another, each of the grinding scratches extending at least one third of the circumference of the dynamic pressure bearing section.

14. A method for manufacturing an oil dynamic pressure bearing device according to claim 12, wherein the grinding scratches in the direction of the circumference are formed independently from one another, each of the grinding scratches continuously extending one third or more of the circumference in the direction of the circumference, and arranged such that the grinding scratches as a whole are arranged along the entire circumference.

15. A method for manufacturing an oil dynamic pressure bearing device according to claim 12, wherein, when the dynamic pressure bearing section, at which the grinding scratches are formed, is traced in an axial direction of the shaft, which is perpendicular to a direction in which the grinding scratches are formed, the degree of surface roughness Ry is Ry=about 0.02 s to 3.2 s.

16. A method for manufacturing an oil dynamic pressure bearing device according to claim 12, wherein the dynamic pressure grooves are formed only on one side of either the shaft or the bearing at the dynamic pressure bearing section and the grinding scratches are formed only on the other side.

17. A method for manufacturing an oil dynamic pressure bearing device according to claim 16, wherein the dynamic pressure grooves are formed only on the bearing side at the dynamic pressure bearing section and the grinding scratches are formed only on the shaft side.

18. A method for manufacturing an oil dynamic pressure bearing device according to claim 12, wherein the grinding scratches in the direction of the circumference are arranged in plurality in concentric form.

19. A method for manufacturing an oil dynamic pressure bearing device according to claim 12, wherein the grinding scratches in the direction of the circumference are arranged in helical form at a plurality of locations, independently from one another.

20. A method for manufacturing an oil dynamic pressure bearing device according to claim 12, wherein the grinding scratches are formed with one of lapping sheet, abrasive cloth containing abrasive particles and sandpaper.

21. A method for manufacturing an oil dynamic pressure bearing device according to claim 12, wherein the grinding scratches are formed with center-less grinding.

* * * * *